(12) United States Patent
Palmroth et al.

(10) Patent No.: US 10,710,591 B2
(45) Date of Patent: Jul. 14, 2020

(54) CONTROL ARRANGEMENT FOR AN ENGINE AND A HYDROSTATIC TRANSMISSION OF A VEHICLE

(71) Applicant: Deere & Company, Moline, IL (US)

(72) Inventors: Lauri Palmroth, Lempaala (FI); Teemu K. Kananoja, Ylojarvi (FI); Ville M. Suoranta, Tampere (FI)

(73) Assignee: DEERE & COMPANY, Moline, IL (US)

( * ) Notice: Subject to any disclaimer, the term of this patent is extended or adjusted under 35 U.S.C. 154(b) by 124 days.

(21) Appl. No.: 15/830,723

(22) Filed: Dec. 4, 2017

(65) Prior Publication Data

US 2018/0201268 A1  Jul. 19, 2018

(30) Foreign Application Priority Data

Jan. 18, 2017 (EP) ..................... 17152032

(51) Int. Cl.
*B60W 30/188* (2012.01)
*B60W 10/06* (2006.01)
*B60W 10/103* (2012.01)

(52) U.S. Cl.
CPC ........ *B60W 30/1884* (2013.01); *B60W 10/06* (2013.01); *B60W 10/103* (2013.01); *B60W 2300/17* (2013.01); *B60W 2510/0614* (2013.01); *B60W 2510/0638* (2013.01); *B60W 2510/1085* (2013.01); *B60W 2510/20* (2013.01); *B60W 2520/10* (2013.01); *B60W 2520/105* (2013.01); *B60W 2520/16* (2013.01); *B60W 2710/0644* (2013.01); *B60W 2710/0677* (2013.01); *B60W 2710/1005* (2013.01); *B60W 2710/1088* (2013.01); *Y02T 10/56* (2013.01); *Y02T 10/84* (2013.01)

(58) Field of Classification Search
None
See application file for complete search history.

(56) References Cited

U.S. PATENT DOCUMENTS

| 6,427,110 | B1 | 7/2002 | Mänken et al. |
| 9,091,342 | B2 | 7/2015 | Ishibashi et al. |
| 2003/0010025 | A1* | 1/2003 | Evans ............ F16H 61/431 60/431 |
| 2005/0071067 | A1 | 3/2005 | Guven et al. |

(Continued)

FOREIGN PATENT DOCUMENTS

| DE | 102007003956 A1 | 11/2007 |
| EP | 2949533 A1 | 12/2015 |

OTHER PUBLICATIONS

European Search Report issued in counterpart application No. 17152032.3 dated Jun. 14, 2017 (7 pages).

*Primary Examiner* — Justin Holmes

(57) ABSTRACT

A control arrangement for use in a drive arrangement of a vehicle includes an engine, a hydrostatic transmission, a load sensing means configured to detect a load on the engine, and an engine speed controller for controlling the engine. The arrangement further includes a pressure control means configured to act on a pressure in the hydrostatic transmission and a drive controller. The load sensing means generates a first signal, and based on the first signal, the drive controller generates a second signal for the engine speed controller and the pressure control means.

8 Claims, 2 Drawing Sheets

(56) References Cited

U.S. PATENT DOCUMENTS

| | | | |
|---|---|---|---|
| 2009/0163319 A1* | 6/2009 | Janasek | B60K 28/165 |
| | | | 477/78 |
| 2013/0239558 A1 | 9/2013 | Shirao | |
| 2014/0257671 A1 | 9/2014 | Laux et al. | |
| 2014/0290236 A1* | 10/2014 | Aizawa | F16H 39/02 |
| | | | 60/443 |
| 2015/0120148 A1* | 4/2015 | Henson | B60L 1/003 |
| | | | 701/48 |
| 2015/0158492 A1* | 6/2015 | Bulgrien | B60W 10/02 |
| | | | 701/53 |
| 2016/0326720 A1 | 11/2016 | Uno et al. | |
| 2020/0055520 A1* | 2/2020 | Glockner | B60W 30/194 |

* cited by examiner

CONTROL ARRANGEMENT FOR AN ENGINE AND A HYDROSTATIC TRANSMISSION OF A VEHICLE

RELATED APPLICATIONS

This application claims priority to European Patent Application Ser. No. 17152032.3, filed Jan. 18, 2017, the disclosure of which is hereby expressly incorporated by reference in its entirety.

FIELD OF THE DISCLOSURE

The present disclosure relates to a control arrangement for use in a hydrostatic transmission of a vehicle, and a method of controlling an engine and a hydrostatic transmission of a vehicle.

BACKGROUND

In the art, DE 10 2007 003 956 A1 discloses a speed control of an engine and a hydrostatic transmission, whereas a vehicle drive speed request is set by an accelerator pedal and an inching percent, i.e., the maximum vehicle speed is reduced, as the fully pressed pedal produces vehicle speed below the maximum speed. There is a fixed and parametrized relation from vehicle speed request to both the engine rpm and hydrostatic transmission gear ratio.

In addition, EP 2 949 533 A1 teaches the control of an engine depending on the predicted operation of a vehicle in order to reduce fuel consumption.

There is, however, a need for a control of a drive assembly of a vehicle, which provides for fuel efficiency, but also keeps the engine powerful and running at a requested speed in spite of the load generated by a hydrostatic transmission propelling the vehicle.

SUMMARY

In one embodiment of the present disclosure, engine speed is not controlled in isolation, but together with a hydrostatic transmission. This allows consideration of the engine characteristic by adjusting a maximum pressure or displacement of a pump and motor in the hydrostatic transmission. The maximum pressure is selected considering the torque and the speed (rpm) of the engine at a given point on the engine characteristics curve, such that the load torque generated by the hydrostatic transmission does not exceed the engine's capability to produce torque, i.e., the hydrostatic transmission does not overload the engine.

Stalling the engine is avoided if the signal generated by a drive controller to a pressure control means provides for a pressure in the hydrostatic transmission lower than the pressure needed to overload or even stall the engine at the engine rpm requested by the drive controller. While normally the maximum pressure is maintained by controlling the position of the swash plates, it may also be possible to operate, e.g., open a pressure relief valve in the case of a load peak.

Load sensing may happen at any suitable place and component like at the engine itself, in a drive component or indirectly from data about the movement itself, like acceleration. In particular, the load at or of the engine is based on data of the engine injection system, the engine exhaust system, vibrations of the engine, driveline torque measurements, transmission pressure measurements, vehicle speed and acceleration, vehicle inclination, steering inputs, operator control inputs, or at least one vehicle component driven by the engine. For instance, the value may be derived directly at the engine or its auxiliaries or where the load comes from. Either combination of data may be useful depending on the given circumstance.

In order to make the estimation of required engine power more sophisticated, the calculation by the drive controller may be based on current as well as on upcoming, i.e., predicted driving circumstances, using a combination of past and present values of driving load to the engine detected by the load sensing means. Values may be collected over a period of, for example, 5 seconds or more.

Smart control, even considering changes in the engine characteristics, may be achieved by the use of a database containing data about engine speed/rpm, pump displacement, engine power requirement estimation, engine fuel efficiency and hydrostatic pressure required to overload/stall the engine. This database can be part of the drive controller.

Since gains in fuel consumption or engine power output may be minimal if at all in upper and/or lower rpm regions, the control may be limited to a user defined range of engine rpm in which the engine speed request controller is allowed to operate. Depending on the engine type, a suitable rpm range may be between 1200 and 1800 rpm.

Information from past driving cycles of the vehicle may be used in a learning algorithm, which is designed to automatically adjust the range of engine rpm based on it.

In another embodiment of this disclosure, a method is provided which detects the current load and selects an engine rpm such that a low amount of fuel is needed and adjusts the load accordingly. A hydrostatic transmission is allowed to operate at maximum pressure while the method operably avoids causing the engine rpm to drop too far or too fast or even stall the engine. In other words, the method may be executed to avoid overloading the engine.

The signal generated by the drive controller to adjust the engine speed may not be based on an instant review of the load situation, but rather on data considering situations over a certain time window, which also allows for a prediction of the development of the load.

Off-road vehicles in forestry, construction and agriculture are suitable for this control arrangement, as they often are driven via hydrostatic transmissions at a fixed rpm and are exposed to sudden load peaks. The principles and teachings of this disclosure, however, may be suitable for any type of on-road or off-road vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
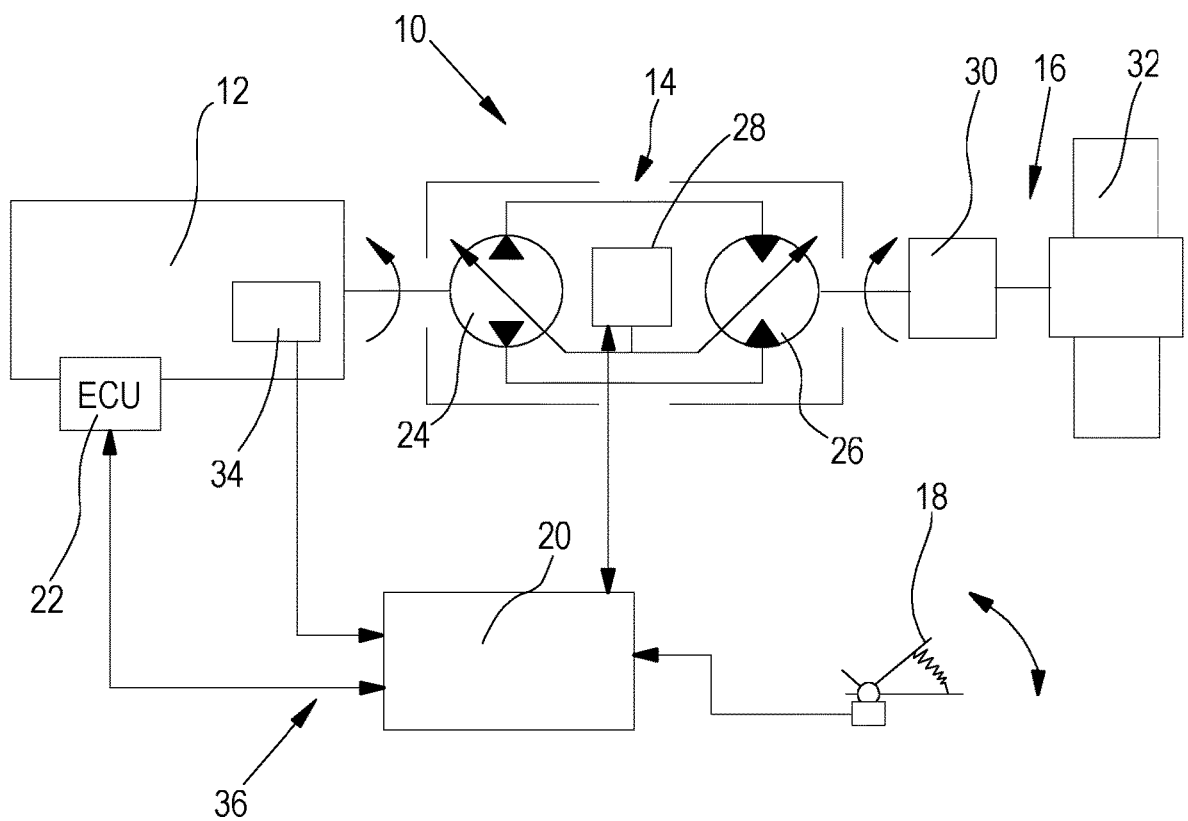
FIG. 1 is a schematic of a drive arrangement.

A drive arrangement 10 shown in FIG. 1 may include an engine 12, a hydrostatic transmission 14, a mechanical driveline 16, a motion controller 18, a drive controller 20 and an engine speed controller 22.

The drive arrangement 10 may be designed for use in an off-road vehicle, like a crawler, an excavator, a loader, a forest harvester, a forwarder, a forage harvester, a combine or any similar kind of construction, forestry or agricultural machine.

The engine 12 normally is a diesel engine with or without a turbocharger, but may be a gasoline engine as well. In this application, the engine 12 is normally driven at a constant speed depending on the circumstances, rather than at constantly varying speeds as this is the case with cars, for example. The engine speed is controlled by means of the engine speed controller 22 acting on an injection system (not shown).

The hydrostatic transmission 14 may include a pump 24 and a motor 26 connected via hoses or pipes. However, more than one pump 24 and motor 26 may be used and one pump 24 may feed more than one motor 26. Both the pump 24 and the motor 26 are of the variable displacement type, whereas the variation normally is achieved by means of internal swash plates (not shown). The maximum hydrostatic work pressure in the hydrostatic transmission 14 is controlled by manipulating the delivering and receiving volume (displacements) in the pump 24 and the motor 26 through changing the inclination of their swash plates electronically or hydraulically. The pressure in the hydrostatic transmission 14 determines the potential of the vehicle equipped with this drive arrangement 10 to overcome an obstacle, like a rock, a ditch, an inclination, etc.

The mechanical driveline 16 in this case includes a mechanical transmission 30 and final drives 32, connected to each other by ordinary means, like clutches, universal shafts, drive shafts, etc. The transmission 30 may be a shift transmission with certain gears as well as a variable transmission like a planetary transmission. In certain applications, the transmission 30 may not provide for a different speed range at all, but just transmits the torque. The transmission 30 may allow the vehicle to drive in different speed modes, like a slow mode off-road and a fast mode on-road, yet inside the respective speed mode the speed will be varied by means of the hydrostatic transmission 14. The control of the transmission 30 may happen manually and isolated from the drive controller 20 or actuated by it. The final drives 32 may include a differential, step down transmissions per wheel and drive shafts as this is customary in the art and drive ground support wheels or tracks.

The motion controller 18 is shown in the kind of a pedal, but is representative of all kinds of actuators needed to control the movement of the vehicle, like speed, direction, acceleration, halt, etc. It may be in the form of a hand-operated lever at a driver station, an electric or electronic switch, a mouse pad, etc., moved or actuated by an operator or an autonomous system. Depending on the physical or virtual position of the motion controller 18, the drive arrangement 10 is supposed to move the vehicle faster, slower, at a given speed, backwards, forwards, etc., over terrain. Accordingly, the motion controller 18 gives a signal to the drive controller 20 indicative of the intended speed and direction. The signals emitted by the motion controller 18 can be, for example, the operator accelerating the vehicle, stopping the vehicle, changing driving direction, steering, or using other engine powered vehicle equipment.

The drive controller 20 is connected to load sensing means 34 shown in FIG. 1 as being related to the engine 12, but this is just an exemplary place for any other location like at the mechanical driveline 16 or the hydrostatic transmission 14. Actually the load sensing means 34 may include sensors placed all over the vehicle. The drive controller 20 also communicates with the motion controller 18 and the engine controller 22 as this is indicated by the arrows shown in FIG. 1. The drive controller 20 receives signals about the engine or driving load related to driving operation. Engine and driving load are monitored using multiple vehicle and engine signals. The engine and driving load related data can be taken from either or several of in any combination the engine injection system, engine air system, engine exhaust system, vibration of the engine, driveline torque measurements, transmission pressure measurements, vehicle speed and acceleration, vehicle inclination, vehicle steering inputs, vehicle operation control inputs or at least one vehicle component driven by the engine 12. Based on the measured signals, specific measures describing driving circumstances are calculated based on past and present values of the measured signals. The calculated measures are, for example, variance of a signal, maximum of a signal, minimum of a signal, median of a signal, or average of a signal within a certain time window. Based on the combination of these signals and calculated measures, the drive controller 20 has a model to calculate an estimate of required engine power demand in the present and upcoming driving situation.

The engine controller 22 contains an ECU for the non-shown injection system working on signals received from the drive controller 20. Drive control happens on the basis of an individual engine characteristic map/database about engine torque and engine speed (rpm) relations with lines of optimal fuel consumption. It is the goal to operate the engine 12 at an engine speed at which its torque/power producing capability is sufficient for the duty, but fuel consumption is as low as possible.

The pressure control means 28 includes components needed to change the displacement in the pump 24 and the motor 26 and thereby the system pressure. Such components usually are electro-hydraulic valves, swash plates, solenoids, etc.

The load sensing means 34, the engine speed controller 22, the pressure control means 28 and the drive controller 20 form a control arrangement 36. While the arrows between the engine speed controller 22 and the pressure control means 28 and the drive controller 20 point in both directions, meaning a closed loop control, it is possible applying an open loop control as well.

Based on above description of the drive arrangement 10 its function is described as follows. The required engine power estimation can be modeled as a neural network model, statistical or probabilistic model comparing the measures to pre-collected statistics of engine and vehicle driving data from various operating conditions, a rule based control pattern or any combination of these above mentioned methods.

The drive controller 20 has a database containing the relation of engine power and optimal engine speed which optimizes fuel efficiency at different engine power requirement levels. The power to optimal engine specific relation is engine specific taking into account the engine torque curves, engine air and injection system difference or exhaust after treatment system difference. Therefore, for a single type of a vehicle multiple different engine variants can be used for example to satisfy different emission regulations.

The drive controller 20 calculates and sends signals to adapt the engine speed request to the fuel-power optimized engine speed. The gear ratio in the hydrostatic transmission 14 is calculated according to the adjusted engine speed such that the engine speed adaptation does not change the vehicle driving speed and a respective signal is sent to the pressure control means 28. The related signal for adjusting the engine speed is sent to the engine speed controller 22. The rate of change in the engine speed request adaptation is limited to be slow enough such that the engine air system and injection system are able to respond and deliver the newly requested engine speed and that the change in engine speed does not result in unwanted disturbance such as oscillation in vehicle driving speed.

To prevent the engine 12 from overloading or stalling at any point of the engine speed operation range, such as in case the driving load suddenly increases if the vehicle is driven onto a sudden obstacle such as large rock, tree or a tree stump, the torque provided by the hydrostatic transmission 14 to the engine 12 must be limited. The torque is limited by limiting the pressure and displacement of the pump 24 via the pressure control means 28. The engine torque is limited by primarily allowing the displacement of the motor 26 to return to its maximum value and secondarily allowing the displacement of the pump 24 to return towards zero. This maximizes the hydrostatic motor torque and tractive force when driving over the terrain obstacle.

Figure 2:
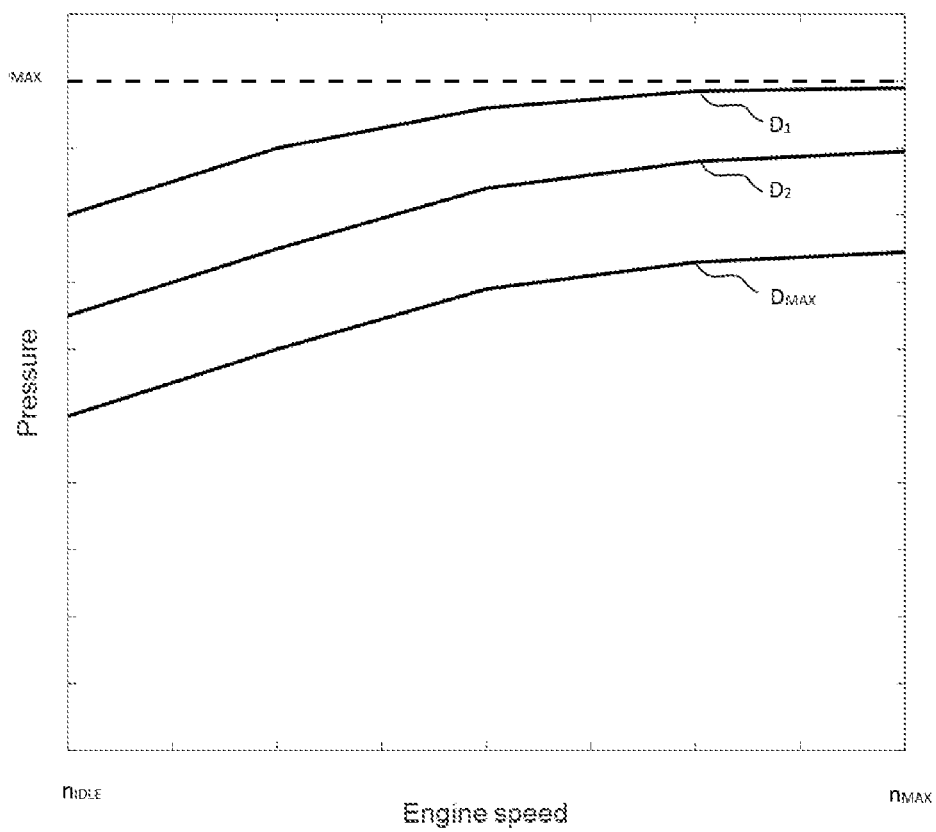
FIG. 2 is a diagram illustrating engine speed vs. hydrostatic pressure.

The maximum dynamical engine torque output is typically not constant over the engine speed operating range, and therefore the maximum allowable pressure is different depending on the engine speed. The drive controller 20 has a database containing the relation of engine operating speed to maximum allowed pressure in the hydrostatic transmission 14. FIG. 2 shows the maximum allowable pressure based on engine maximum power. The individual pressure curves $D_1$, $D_2$, $D_{max}$ in FIG. 2 stand for different displacements. The engine speed/pressure relation takes into account the displacement of the pump 24 such that a small displacement correlates to a higher pressure. Instead of engine speed, the maximum allowable pressure can be calculated from any other engine air system or injection system value, such as turbocharged air pressure, that describes the engines capability to produce output torque/power. If needed, the maximum pressure line of the hydrostatic transmission 14 may include reserved engine power for other functions than driving that are powered by the engine 12 while driving. $P_{max}$ indicated in the left upper corner of the charter means the maximum allowed system pressure in the hydrostatic transmission 14.

Drive controller 18 calculates the maximum pressure for the adjusted engine speed. In case the pressure exceeds the maximum pressure, the drive controller 20 reduces the gear ratio in the hydrostatic transmission 14 by primarily increasing the displacement of the motor 26 and secondarily reducing the displacement of the pump 24. The varying limitation of maximum allowed pressure can alternatively be controlled by using separate valve(s) that manipulate the displacements of motor 26 and/or the pump 24 of the hydrostatic transmission 14.

Figure 3:
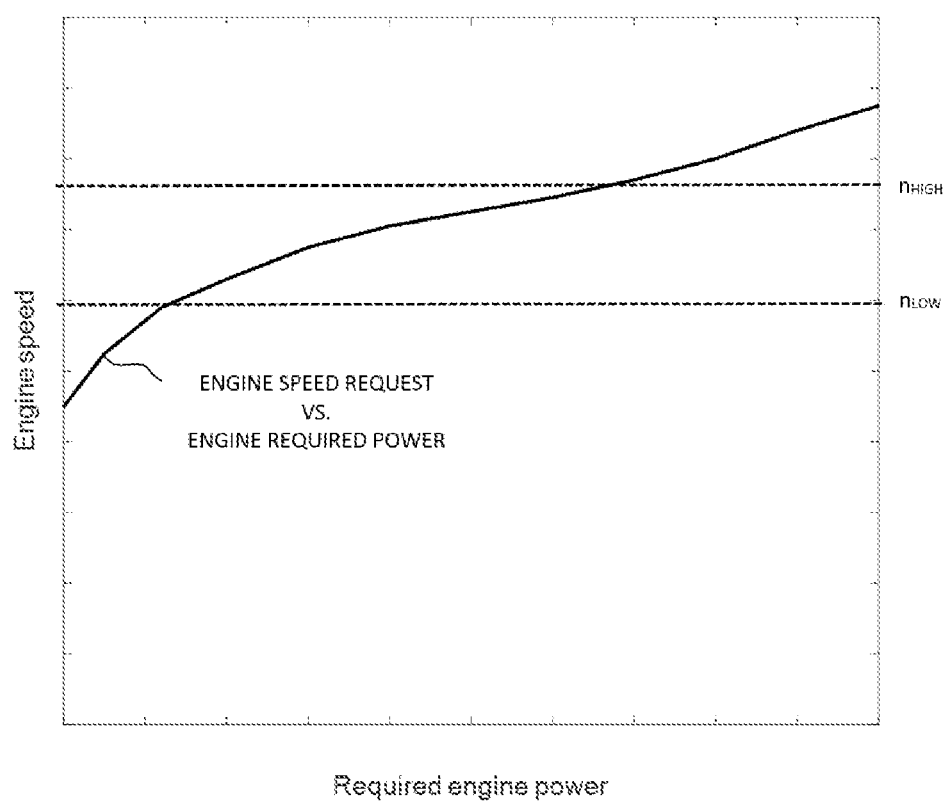
FIG. 3 is a diagram illustrating engine power vs. engine speed.

Depending on the vehicle operation or worksite circumstances, it may not be feasible to operate the engine 12 throughout the entire engine speed range. Therefore, the drive controller 20 includes upper and lower limits to define the engine speed operation range. The range of engine speed operation is shown in FIG. 3, where $n_{low}$ may stand for 1200 rpm (more or less) and $n_{high}$ for 1800 rpm (more or less). Given that the vehicle typically operates at a defined worksite and the vehicle operation may be cyclic by nature, it may be possible to estimate the operating conditions of the work site based on the driving cycles or on input coming from the use of certain equipment on the vehicle, like a crane. The control system includes a learning algorithm which determines the upper and lower limits for the engine speed, using the calculated engine power requirements and engine speed requests of the previous driving cycles. Instead of automatically adapting engine speed range, the vehicle operator may have an option to manually define the engine speed operating range.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A control arrangement for use in a drive arrangement of a vehicle, comprising:
   an engine;
   a hydrostatic transmission;
   a load sensing means configured to detect a load on the engine;
   an engine speed controller for controlling the engine;
   a pressure control means configured to act on a pressure in the hydrostatic transmission; and
   a drive controller;
   wherein, based on a first signal generated by the load sensing means, a second signal is generated by the drive controller for the engine speed controller and the pressure control means;
   wherein the signal generated by the drive controller to the pressure control means provides for a maximum allowed pressure in the hydrostatic transmission to be lower than the pressure needed to stall the engine at a selected engine speed.

2. The control arrangement according to claim 1, wherein the estimation of required engine power calculated by the drive controller is based on current and upcoming driving circumstances using a combination of past and present values of driving load to the engine detected by the load sensing means.

3. The control arrangement according to claim 1, wherein in the drive controller comprises a user defined range of engine speed of which the engine speed controller is operable.

4. A control arrangement for use in a drive arrangement of a vehicle, comprising:
   an engine;
   a hydrostatic transmission;
   a load sensing means configured to detect a load on the engine;
   an engine speed controller for controlling the engine;
   a pressure control means configured to act on a pressure in the hydrostatic transmission; and
   a drive controller;
   wherein, based on a first signal generated by the load sensing means, a second signal is generated by the drive controller for the engine speed controller and the pressure control means;
   wherein the load at the engine sensed by the load sensing means is based on data of one or more of an engine injection system, an engine exhaust system, vibration of the engine, driveline torque measurements, transmission pressure measurements, vehicle speed and acceleration, vehicle inclination, steering inputs, operator control inputs or at least one vehicle component driven by the engine.

5. A control arrangement for use in a drive arrangement of a vehicle, comprising:
- an engine;
- a hydrostatic transmission;
- a load sensing means configured to detect a load on the engine;
- an engine speed controller for controlling the engine;
- a pressure control means configured to act on a pressure in the hydrostatic transmission;
- a drive controller; and
- a database for storing data about engine speed, pump displacement, engine power requirement estimation, engine fuel efficiency and pressure required to stall the engine;
- wherein, based on a first signal generated by the load sensing means, a second signal is generated by the drive controller for the engine speed controller and the pressure control means.

6. A control arrangement for use in a drive arrangement of a vehicle, comprising:
- an engine;
- a hydrostatic transmission;
- a load sensing means configured to detect a load on the engine;
- an engine speed controller for controlling the engine;
- a pressure control means configured to act on a pressure in the hydrostatic transmission; and
- a drive controller;
- wherein, based on a first signal generated by the load sensing means, a second signal is generated by the drive controller for the engine speed controller and the pressure control means;
- wherein the drive controller comprises a learning algorithm which is executable to automatically adjust the operating range of engine speed based on past driving cycles of the vehicle.

7. A method of controlling an engine and a hydrostatic transmission of a vehicle, comprising:
- sensing a driving load on the engine by a load sensing means
- sending the driving load to a drive controller;
- calculating an estimate of required engine power by the drive controller;
- generating a first signal by the drive controller aligning an engine speed request to the estimate of required engine power;
- generating a second signal by the drive controller aligning a gear ratio of the hydrostatic transmission with the vehicle drive speed request at the given engine speed value; and
- generating a third signal by the drive controller aligning the maximum allowed pressure in the hydrostatic transmission with the given engine speed value;
- wherein the generating a third signal step comprises providing for a maximum allowed pressure in the hydrostatic transmission to be lower than a pressure needed to stall the engine at the given engine speed value.

8. The method according to claim 7, wherein the calculating step comprises estimating the required engine power based on data collected over a period of time and indicative of the current and upcoming driving circumstances.

* * * * *